Inventor
RICHARD F. SMITH
By William H. Drake
Attorney

June 1, 1943.   R. F. SMITH   2,320,805
STRUCTURAL TOOL
Filed Nov. 14, 1940   2 Sheets-Sheet 2

Inventor
RICHARD F. SMITH

By William H. Drake
Attorney

Patented June 1, 1943

2,320,805

UNITED STATES PATENT OFFICE 2,320,805

STRUCTURAL TOOL

Richard F. Smith, Norfolk, Va., assignor to Welding Tools and Engineering Corporation, Norfolk, Va., a corporation of Virginia Application November 14, 1940, Serial No. 365,714

2 Claims. (Cl. 113—99)

My invention relates to bending and straightening tools and more particularly to tools in the form of a jack clamp for bringing structural pieces such as steel plates into shape to be joined to other structural pieces.

At the present time, the fabrication of large metal structures such as ships and oil tanks calls for excessive time and labor in bending the metal plates. After a plate is partly attached to the structure, a bend may have to be imparted to the plate and any buckled places removed. It is especially true of welded joints that a close fit between parts must be had before a satisfactory weld can be secured. Various devices are used to bend or straighten the plate on the spot, but these all are inefficient.

In welding together a structure, it is common practice to weld a steel saddle to one plate and force it against another plate on the saddle side by driving a wedge. A saddle of the proper height and a wedge of the proper dimensions must be constructed, and these dimensions are often exacting. After use the saddle must be chipped off of the plate, a process not only tedious but often causing craters in the plate, which have to be filled up. Generally a saddle is not used again and this means that a new saddle and wedge is usually made for each operation.

It will be appreciated that one of the difficulties with using a saddle and wedge is that the force resulting from sliding contact with a wedge is not in line with the welded part of the saddle unless a wedge of slight incline is used with a broad and thick based saddle. Such a combination of saddle and wedge would be cumbersome and without sufficient "lift" to be practical. In practice a thin strip is used for the saddle together with a moderately steep wedge, but to keep the resultant lifting force from tearing the saddle loose along its welded edge, a strong double weld must be used. Such a double weld is not only tedious and time consuming to apply but also it requires extra time and effort for its removal, requiring the chipping process previously mentioned.

Sometimes "dogs" are used instead of saddles and wedges but these too are usually made to fit the work required only to be thrown away after use. Again, exacting measurements are often required or they will not serve the desired purpose. Furthermore, "dogs" require extra length of material to be welded (and later thrown away) in order to furnish the connection to the work. As used, the welded part of the dog is pressed down at one end and pulled up at the other end with a consequent need of a strong weld to prevent its coming loose. One serious drawback inherent in the "dog" is that any span covering more than the minimum amount of material would involve enormous waste since the "dog" unit is made up separately for each operation.

Through bolts can only be used where rivet holes extend through both plates. Even the use of through bolts is tedious and often requires an extra man on the other side of the plate.

One object of my invention is to provide a tool that will lessen the above difficulties by saving time and labor.

Another object of my invention is to provide a tool that may be used repeatedly for bending or straightening jobs involving various dimensions and without damage to the materials to be bent or straightened.

A further object of my invention is to provide a three point jack affording central attachment for various leverages relative to the two ends, and being attached at the center to a washer or other small piece that is tack welded to work, or optionally gripping the work at the central attachment.

Still another object of my invention is to provide a means of bending a member from one side only.

Yet another object is to afford instrumentalities for bringing the surface of one structural member such as a plate up against the edge of another structural member.

Other objects may be apparent from the following description and the accompanying drawings.

Briefly, the tool consists of a long frame or beam member having means at its ends for exerting pressure away from the tool and means intermediately positioned for exerting force toward the tool. For illustration, there is depicted in the accompanying drawings a frame having a screw jack at one end, a broad base at the other end, and a hook or a clamp intermediately placed. The hook is designed to fit through the hole of a washer welded edgewise to the work. The clamp is designed to fit around the edges of the work and hold to it.

Figure 1:
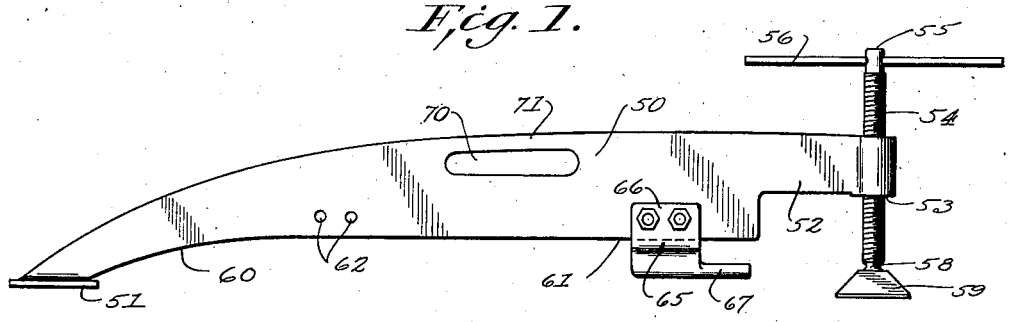
Figure 1 is a side view of the tool showing central hook set near the jack end.

Referring to Figure 1, the tool consists of a frame or narrow beam 50 having a widened base comprising foot pieces 51 extending laterally from the bottom surface of one end of the frame and an extension 52 at the other end of the frame or beam. Extension 52 has formed in it a threaded bore 53 in which moves a threaded rod 54 surmounted by head 55, which in turn is operated by a conventional lever bar 56 slidably fitting in a transverse aperture of head 55. A conventional ball and socket joint 58 adjustably attaches pressure cap 59 to the opposite end of threaded rod 54. It will be noted that the bore 53 extends depthwise from the top to the bottom edge of the beam member.

Frame 50 has a lower or bottom edge 60 that curves up from foot pieces 51 to provide a straight attachment edge 61 substantially parallel to the foot pieces 51. Attachment holes 62 are suitably provided in frame 50 near attachment edge 60 in such positions that hook member 65 may be attached and secured, as by bolting, in either the position shown or a position halfway between foot pieces 51 and pressure cap 59.

Hook member 65 has side portions 66 adapted to fit along the sides of attachment edge 61 and which are suitably apertured to conform to holes 62 in edge 61. Depending from side portions 66 is a round projection 67 extending in a line parallel to the attachment edge 61, or, stated in its more essential relations, in vertical alignment with beam 50 and in a direction perpendicular to the axis of the rod 54.

Extension 52 is positioned well above the line of attachment edge 61 in order that pressure cap 59 may be raised above that line. Conveniently formed in the frame 50, as in the upper central portion is a hand hole 70 leaving a handle 71 fashioned above the approximate center of gravity for the entire frame or beam. The frame 50 is shown tapered toward foot pieces 51 in order to save weight. Also, weight saving openings may be distributed about the frame transverse of the frame without impairing strength.

Figure 2:
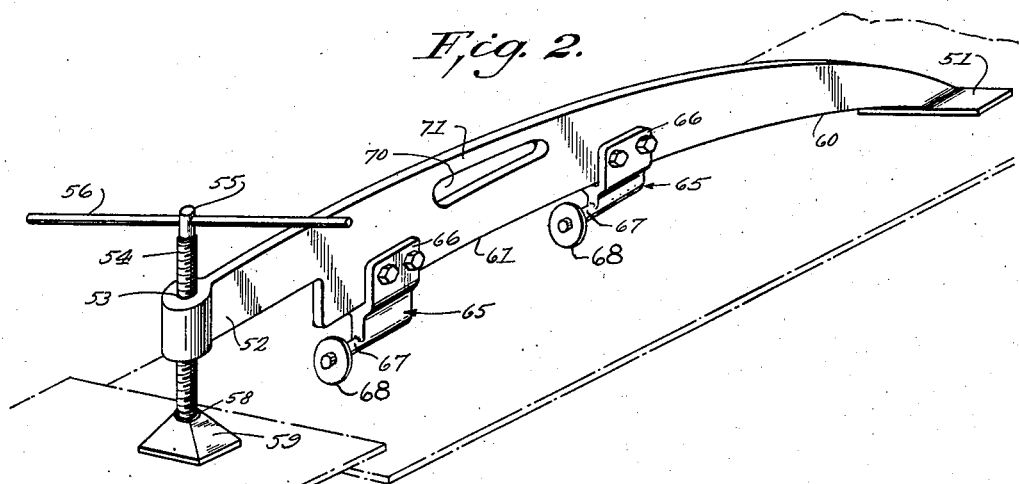
Figure 2 is an oblique view of the tool showing position of its washers.

As shown in Figure 2, more than one hook member at a time may be made a part of the tool. In this figure are shown the spatial relationship of washers 68, 68, one of which is present and temporarily welded to some portion of the structural pieces that is to be drawn relatively to the portions contacting foot pieces 51 and pressure cap 59.

A tack weld is used to unite the washer 68 to the plate unless an especially strong pull is to be exerted. Where a washer is thus welded only to one side, it need only be tapped on one side and in the direction of the weld and it comes off. When a washer welded on both sides is to be removed, it can be knocked out by tapping on its edge. This eliminates the possibility of tearing out a portion of the plate.

Figure 3:
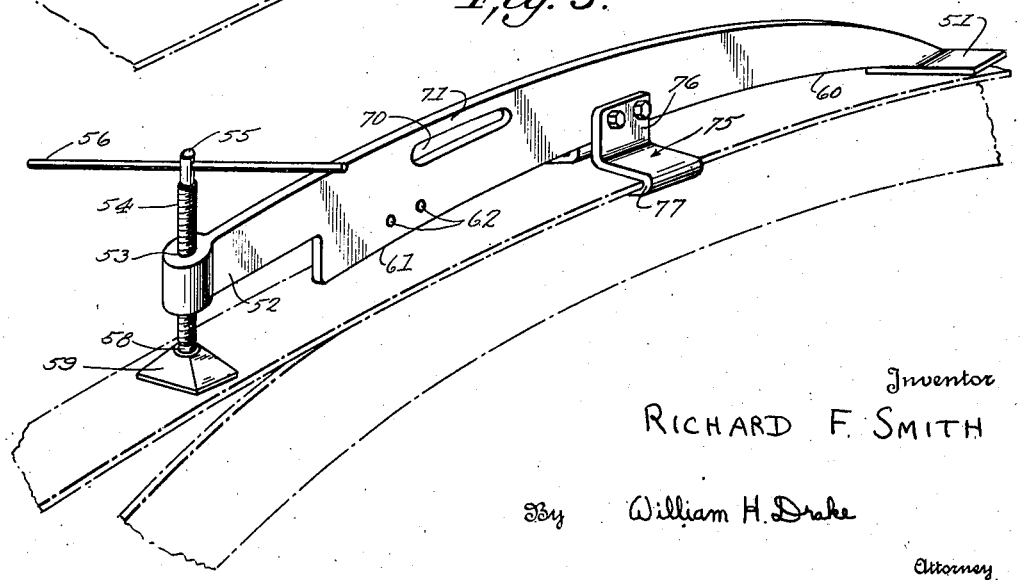
Figure 3 is an oblique view of the tool provided with a central clamp attachment showing how flanges and webs may be curved together.

A holding member 75, shown in Figure 3, may be used instead of hook member 65. Holding member 75 consists of side parts 76 apertured to be secured to each side of attachment edge 61, and of U-shaped extensions 77 adapted to fit around the edges of a face plate or a flange.

Figure 4:
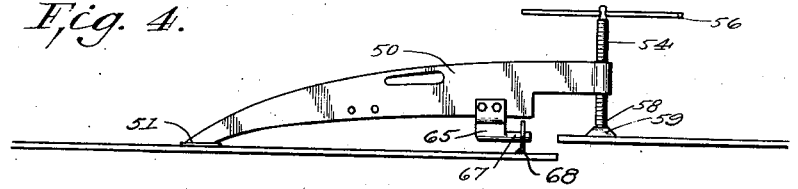
Figure 4 illustrates a method of bringing two plates together for a butt weld.

As shown in Figure 4, the tool, with hook member 65 attached near the pressure cap 59, can be used to bring the edge of one plate even or in desired alignment with that of another. The lower plate is drawn up at its edge to meet the upper plate after tack welding a washer 68 near the upper edge of the lower plate in a position which is perpendicular to the plane of the substantially parallel forces exerted by the foot pieces 51 and pressure cap 59. This drawing up is done by engaging hook member 65 in the washer 68, placing foot pieces 51 away from the edge and then applying pressure with the jack device through pressure cap 59. In this way the tool is used to regulate the seam and butt edges of the plates to proper fairness or alignment, pulling up on one plate and pushing down on the other plate.

Figure 5:
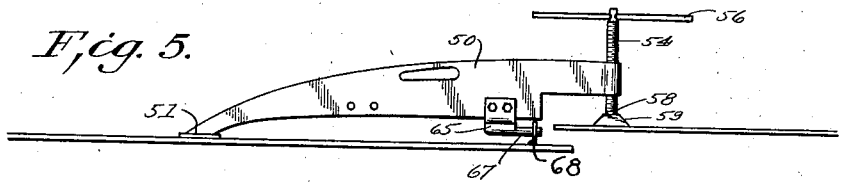
Figure 5 shows the method of bringing two plates together for a lap weld.

As shown in Figure 5, the washer 68 is welded to the lower plate at a point where the edge of the upper plate will clear it slightly. With hook member 65 near pressure cap 59, which latter is set on the upper plate, the tool will bring the bottom plate up relatively to the upper plate and secure them in alignment.

Figure 6:
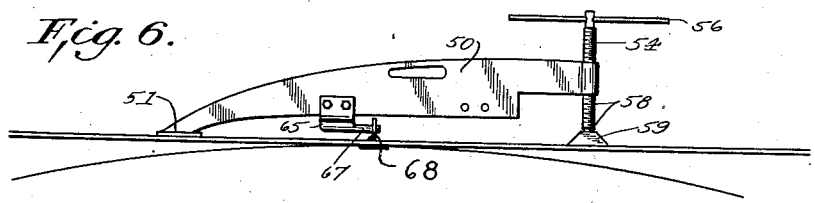
Figure 6 shows a method of bending a plate evenly.

As shown in Figure 6, the tool with hook member 65 set in the middle position, may be used to align or curve a plate or strip to fit. A washer 68 is tack welded to the work and engaged by the hook while both ends of the tool exert downward pressure when threaded bar 54 presses downward through pressure cap 59. In this case, the weld will extend as an element of the curved surface produced by bending.

Figure 7:
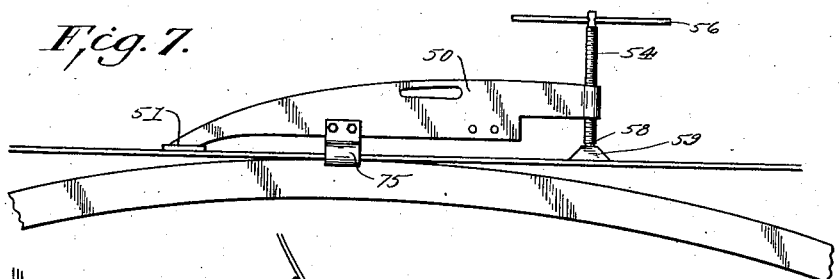
Figure 7 shows a method of curving a flange onto a curved web by clamping the tool at its center to a previously welded portion of the flange.

As shown in Figure 7, the tool, with holding member 75 attached at the center, may be used to form an I-beam or other structural member, by joining a face plate or flange to a bar or a web. First the flange is welded to the web at a point away from the end of the flange. Then holding member 75 is slipped or fitted to engage the edges of the flanges. Pressure applied by foot pieces 51 and pressure cap 59 curve one section of the flange to fit. Then after that section is welded, the tool is moved until the holding member is at the edge of the already welded portion and the process is repeated.

Figure 8:
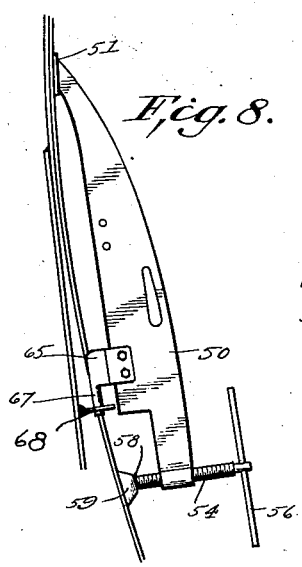
Figure 8 shows a method of curving plates against other structural members such as of the hull of a ship, all curving being done from the inside.

As shown in Figure 8, the tool may be used to bring plates up to structural members such as channel bars and angle bars. This is done by welding a washer 68 to the plate and exerting pressure directly on the structural member by the use of the screw or jack applied through pressure cap or pad 59. By this method plate bending can be done entirely from the inside of a ship.

Figure 9:
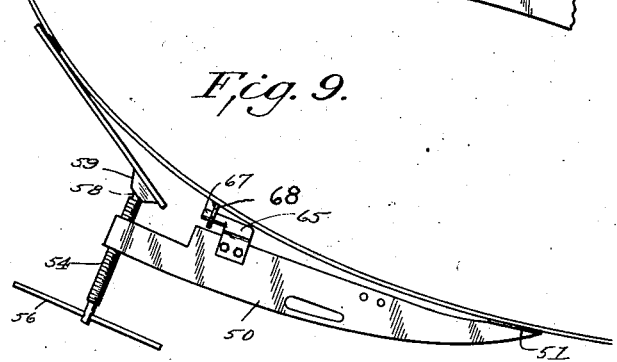
Figure 9 shows a method of curving plates against other structural members such as of the hull of a ship, all work being done from the outside.

As shown in Figure 9, one method of bringing plates up to the structural members from the outside of the curve is to get a double purchase on one of the structural members. A washer 68 is riveted to the near side of the structural member and the hook member 65 is placed through the washer with foot pieces 59 away from the plate's edge. Then pressure at the pressure cap will curve the plate into position.

Another method, more convenient, for bringing plates up to the structural members from the outside of the curve was shown in Figure 6. Both this and the method of Figure 9 may be used to fit plates entirely from the outside of a ship.

It can be noted that during any pivoting motion of the tool relative to the washer necessary movement of round projection 67 of hook member 65 can take place relative to the complementally engaged washer. Also, the ball joint 58 can permit such adjustment or accommodation in pressure cap 59.

The advantage of using a relatively thin washer for the replaceable, expendable weld-connections lies in their availability, cheapness, angular accommodation of the tool (just discussed), strength for amount of material, and in the fact that the washer being a relatively thin plate can be placed parallel to the edge of a plate to be bent.

However, other replaceable and expendable connections can be used and I do not wish to limit my invention to the preferred use of washers or relatively thin plates having an equivalent washer-like opening. For instance a rectangular strip with an exaggerated bead at one end may be used to fit laterally into a channel with overhanging sides formed in the tool. These rectangular strips of various lengths can be used by welding to the work at their ends away from the work.

Furthermore, while a single screw jack at one end of the frame was the pressure means shown, various other combinations are possible to enable the ends to press down relatively to the middle part. For instance, a single jack may pull up in the middle, or two jacks may press down with one at each end, or three jacks may be used, two pressing downward and one lifting, or vice versa. The pressure means may be by lever and ratchet, or hydraulic, or of any practical type.

The several illustrations of applications are not intended to be exhaustive. Naturally various positions of the hook members 65 or of the holding member 75 may be used depending upon the distribution of leverage desired to be distributed to the two ends. Other attachment holes may be provided than those shown. Also hooks, or holding means or clamps may be made integral with the frame work or permanently secured to it.

It will be seen that the tool described in this specification and illustrated in Figures 1 and 2 enables a tack welded metal piece, with an opening therethrough to receive the projection 67, to be used as a way of pulling on a section of material from the rear side. By having a permanent three point jack made to be attachable to it at the central portion of the jack, the metal piece receives a pull so much in line with the weld that a small tack weld is sufficient except for unusually heavy pulls. The three point jack can provide a variation in lift and relative spans between the points of leverage.

It will be seen that I have invented a highly useful tool especially in view of the present need for speed in ship building. Less waste material results and time in plate fitting is saved and each man's efficiency is increased. The tool is useful not only in building hulls but also in assembling bulkheads on the floor of a ship, and in fitting bulkheads to the ship.

The accompanying drawings illustrate my invention and show the preferred embodiment of the tool, but I wish it understood that I am to be limited only by the spirit of the invention and the scope of the accompanying claims.

It is noteworthy that the handle 71 is particularly convenient for carrying the jack, and for directing projection 67 into the openings in washers 68.

I claim:

1. A jack clamp of the character described for operating on one side only of a structural metal member, comprising an elongated and narrow beam member having top and bottom edges, said beam member having a transversely extending widened base rigidly secured to one end, a threaded rod, a pressure pad having a ball and socket connection with one end of said threaded rod, the other end of said beam member being provided with a threaded bore portion extending depthwise thereof and receiving said threaded rod, means for turning the threaded rod, and a hook member secured to said beam member against rotating movement, said hook member including a projection depending from the bottom edge of the beam member in alignment therewith and in a direction perpendicular to the axis of the threaded rod, and said projection being transversely rounded on its portion adjacent the beam member to provide pivotal accommodating movement with an engaged washer or similar member.

2. The combination comprising a jack clamp of the character described for operating on one side only of a structural metal member, said jack clamp comprising an elongated beam member having top and bottom edges, said beam member having a transversely extending widened base rigidly secured to one end, a threaded rod, a pressure pad having a ball and socket connection with one end of said threaded rod, the other end of said beam member being provided with a threaded bore portion extending depthwise thereof, and receiving said threaded rod, means for turning the threaded rod, a hook member secured to said beam member against rotating movement, said hook member including a projection depending from the bottom edge of the beam member in alignment therewith and in a direction perpendicular to the axis of the threaded rod, and said projection being transversely rounded on its portion adjacent the beam member, and a relatively thin plate having an opening therethrough complementally engaging the said transversely rounded portion of the hook member projection and adapted to be temporarily tack welded to the structural metal member for the desired operation thereon by said jack clamp.

RICHARD F. SMITH.